United States Patent
Shikida et al.

(10) Patent No.: US 12,407,482 B2
(45) Date of Patent: Sep. 2, 2025

(54) RADIO COMMUNICATION APPARATUS, REFERENCE SIGNAL ASSIGNMENT METHOD, AND NON-TRANSITORY COMPUTER READABLE MEDIUM

(71) Applicant: NEC Corporation, Tokyo (JP)

(72) Inventors: Jun Shikida, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 527 days.

(21) Appl. No.: 17/731,442

(22) Filed: Apr. 28, 2022

(65) Prior Publication Data

US 2022/0368476 A1 Nov. 17, 2022

(30) Foreign Application Priority Data

May 12, 2021 (JP) ................................. 2021-081172

(51) Int. Cl.
*H04L 5/00* (2006.01)
*H04W 72/542* (2023.01)

(52) U.S. Cl.
CPC ............ *H04L 5/006* (2013.01); *H04L 5/0048* (2013.01); *H04W 72/542* (2023.01)

(58) Field of Classification Search
CPC ..... H04L 5/006; H04L 5/0048; H04L 1/0026; H04W 72/542
See application file for complete search history.

(56) References Cited

U.S. PATENT DOCUMENTS

| | | | |
|---|---|---|---|
| 6,512,738 B1 * | 1/2003 | Namekata | H04B 7/0845 370/480 |
| 2005/0174929 A1 * | 8/2005 | Hayashi | H04L 25/022 370/208 |
| 2010/0124341 A1 * | 5/2010 | Kano | H04R 1/1083 381/94.1 |
| 2012/0106489 A1 | 5/2012 | Konishi et al. | |
| 2016/0127094 A1 | 5/2016 | Jiang et al. | |
| 2018/0234222 A1 | 8/2018 | Jiang et al. | |
| 2018/0365975 A1 | 12/2018 | Xu et al. | |
| 2020/0067739 A1 | 2/2020 | Tang | |

FOREIGN PATENT DOCUMENTS

| | | |
|---|---|---|
| CN | 105656539 A | 6/2016 |
| JP | 2003-333008 A | 11/2003 |
| JP | 2011-035828 A | 2/2011 |
| JP | 2011-083014 A | 4/2011 |
| JP | 5325982 B2 | 10/2013 |
| JP | 2017-537502 A | 12/2017 |
| JP | 2019-506772 A | 3/2019 |
| JP | 2020-520585 A | 7/2020 |

OTHER PUBLICATIONS

JP Office Action for JP Application No. 2021-081172, mailed on Mar. 18, 2025 with English Translation.

* cited by examiner

Primary Examiner — Jamal Javaid

(57) ABSTRACT

A radio communication apparatus includes a distortion calculation unit and an assignment unit. The distortion calculation unit calculates the degree of distortion of the frequency response of the channel between the radio communication apparatus and the radio terminal. Further, the assignment unit assigns the reference signal to the radio terminal based on the degree of distortion calculated by the distortion calculation unit.

14 Claims, 8 Drawing Sheets

RADIO COMMUNICATION APPARATUS, REFERENCE SIGNAL ASSIGNMENT METHOD, AND NON-TRANSITORY COMPUTER READABLE MEDIUM

INCORPORATION BY REFERENCE

This application is based upon and claims the benefit of priority from Japanese patent application No. 2021-081172, filed on May 12, 2021, the disclosure of which is incorporated herein in its entirety by reference.

TECHNICAL FIELD

The present disclosure relates to a radio communication apparatus, a reference signal assignment method, a reference signal assignment program, and a non-transitory computer readable medium storing thereof.

BACKGROUND ART

In mobile communication systems such as LTE (Long Term Evolution) and NR (New Radio), a terminal transmits a sounding reference signal (SRS: Sounding Reference Signal) to a base station (e.g., Published Japanese Translation of PCT International Publication for Patent Application, No. 2020-520585). The SRS is used to measure the quality of a channel in the uplink. The base station estimates an impulse response or a frequency response of the channel in the uplink by using the SRS transmitted from the terminal, and uses the result of the estimation for the allocation of frequency resources in the uplink and beamforming transmission in the downlink.

It is desirable that the frequency of the transmission of SRSs (i.e., how often SRSs are transmitted) be such that the base station can follow (i.e., cope with) changes in the channel over time (hereinafter also referred to as "temporal changes of the channel"). When the frequency of the transmission of SRSs is low as compared to the degree of temporal changes of the channel (e.g., how often the channel changes), the allocation of frequency resources suitable for the state of the channel and/or the beamforming suitable therefor cannot be performed, so that the communication quality deteriorates. On the other hand, when the frequency of the transmission of SRSs is high as compared to the degree of temporal changes of the channel, the frequency resources available for data communication in the uplink are reduced by an amount equivalent to the amount allocated for the SRSs, so that the amount of data communication in the uplink is reduced.

A technology related to the assignment of the transmission of SRSs is disclosed in Japanese patent No. 5325982. Japanese Patent No. 5325982 discloses a method for assigning the transmission of SRSs based on the moving speed of a terminal. Japanese Patent No. 5325982 discloses a method for determining the interval of transmission of SRSs and allocating a transmission bandwidth so that, for a terminal whose moving speed is high, the transmission of the SRSs for the entire bandwidth is completed in a short time.

However, the degree of temporal changes of the channel does not depend solely on the moving speed of the terminal. Therefore, in the method described in Japanese Patent No. 5325982, the transmission of SRSs are excessively assigned to a terminal(s) whose moving speed is high, thus possibly causing inefficient assignment of SRSs.

SUMMARY

The present disclosure has been made to solve the above-described problem, and an example object of the disclosure is to provide a radio communication apparatus, a reference signal assignment method, a reference signal assignment program, and a non-transitory computer readable medium storing thereof capable of appropriately assigning a reference signal to a radio terminal.

In a first example aspect, a radio communication apparatus includes:
 a distortion calculation unit configured to calculate a degree of distortion of a frequency response of a channel between the radio communication apparatus and a radio terminal; and
 an assignment unit configured to assign a reference signal to the radio terminal based on the degree of distortion.

In another example aspect, a reference signal assignment method performed by a radio communication apparatus, includes:
 calculating a degree of distortion of a frequency response of a channel between the radio communication apparatus and a radio terminal; and
 assigning a reference signal to the radio terminal based on the degree of distortion.

In another example aspect, a reference signal assignment program and a non-transitory computer readable medium storing thereof cause a radio communication apparatus to perform a reference signal assignment method, the reference signal assignment method including:
 calculating a degree of distortion of a frequency response of a channel between the radio communication apparatus and a radio terminal; and
 assigning a reference signal to the radio terminal based on the degree of distortion.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Example embodiments according to the present disclosure will be described hereinafter with reference to the drawings. Note that, for clarifying the explanation, the following descriptions and the drawings are partially omitted and simplified as appropriate. Further, the same symbols are assigned to the same elements throughout the drawings, and redundant explanations are omitted as appropriate. Also, in this disclosure, unless otherwise specified, "at least one of A or B (A/B)" may mean any one of A or B, or both A and B. Similarly, when "at least one" is used for three or more elements, it can mean any one of these elements, or any plurality of elements (including all elements).

First Example Embodiment

Figure 1:
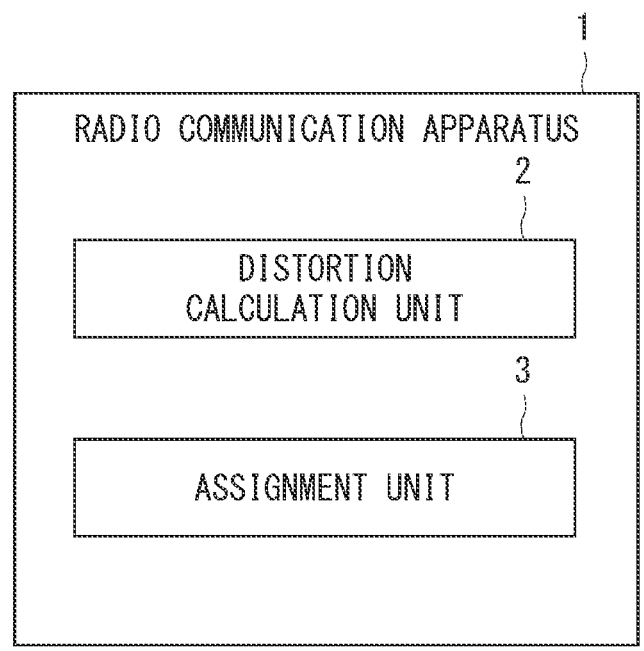
FIG. 1 shows an example of a configuration of a radio communication apparatus according to a first example embodiment.

An example of a configuration of a radio communication apparatus 1 according to a first example embodiment will be described with reference to FIG. 1. FIG. 1 shows the example of the configuration of the radio communication apparatus according to the first example embodiment. The radio communication apparatus 1 performs radio communication with at least one radio terminal (not shown). The radio communication apparatus 1 includes a distortion calculation unit 2 and an assignment unit 3.

The distortion calculation unit 2 calculates the degree of distortion of the frequency response of a channel between the radio communication apparatus 1 and the radio terminal. The degree of distortion of the frequency response may be defined as the degree of changes of the amplitude of the frequency response over frequencies.

The assignment unit 3 assigns a reference signal to the radio terminal based on the degree of distortion calculated by the distortion calculation unit 2. The reference signal may be a reference signal used to measure the quality of a channel in the uplink. The reference signal may be an SRS or any other reference signal different from the SRS.

Figure 2:
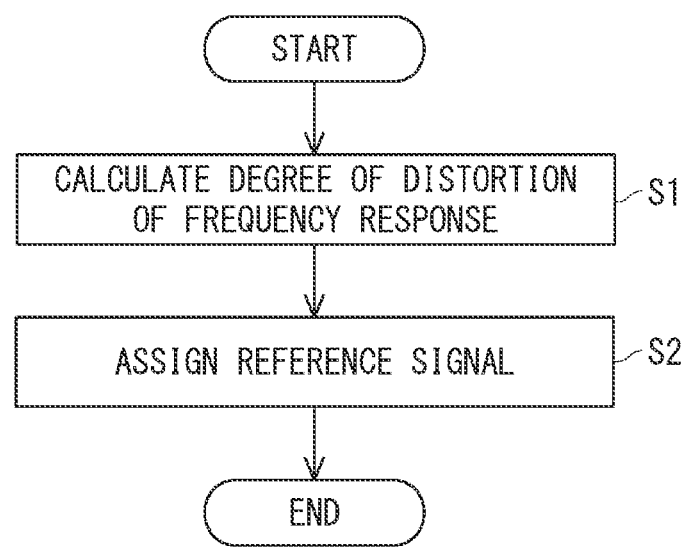
FIG. 2 shows an example of operations performed by a radio communication apparatus according to the first example embodiment.

Next, an example of operations performed by the radio communication apparatus 1 according to the first example embodiment will be described with reference to FIG. 2. FIG. 2 shows an example of operations performed by the radio communication apparatus according to the first example embodiment.

The distortion calculation unit 2 calculates the degree of distortion of the frequency response of a channel between the radio communication apparatus 1 and the radio terminal (Step S1).

The assignment unit 3 assigns a reference signal to the radio terminal based on the degree of distortion of the frequency response calculated by the distortion calculation unit 2 (Step S2).

As described above, the radio communication apparatus 1 calculates the degree of distortion of the frequency response of the channel between the radio communication apparatus 1 and the radio terminal. Then, the radio communication apparatus 1 assigns a reference signal to the radio terminal based on the calculated degree of distortion of the frequency response. The radio communication apparatus 1 can determine the stability of the channel based on the degree of distortion of the frequency response of the channel. The radio communication apparatus 1 can estimate the degree of temporal changes of the channel based on the result of the determination on the stability of the channel. Therefore, according to the radio communication apparatus 1 in accordance with the first example embodiment, it is possible to assign a reference signal to the radio terminal so as to avoid excessive assignment while taking the degree of temporal changes of the channel into consideration and thereby following (i.e., coping with) the temporal changes of the channel. Therefore, according to the radio communication apparatus 1 in accordance with the first example embodiment, it is possible to appropriately assign a reference signal to the radio terminal.

Second Example Embodiment

Next, a second example embodiment will be described. The second example embodiment is a specific example embodiment of the first example embodiment.
<Example of Configuration of Radio Communication System>

Figure 3:
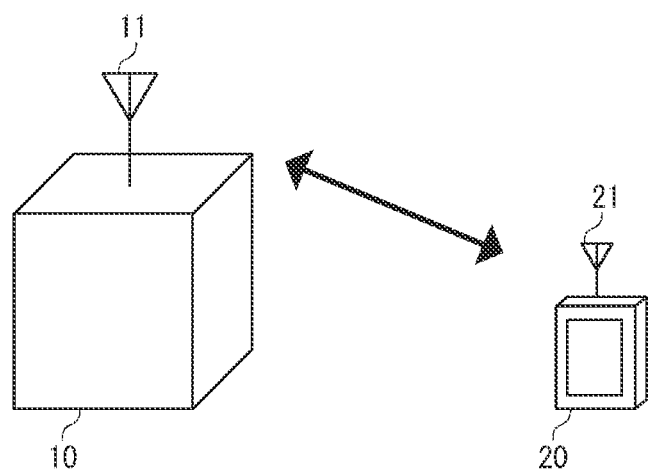
FIG. 3 shows an example of a configuration of a radio communication system according to a second example embodiment.

An example of a configuration of a radio communication system 100 according to the second example embodiment will be described with reference to FIG. 3. FIG. 3 shows the example of the configuration of the radio communication system according to the second example embodiment. The radio communication system 100 may be an NR system, which is a fifth generation mobile communication system (a 5G system). Alternatively, the radio communication system 100 may be an LTE system. Alternatively, the radio communication system 100 may be an LTE-Advanced system. Alternatively, the radio communication system 100 may be a sixth generation mobile communication system.

The radio communication system 100 includes a radio communication apparatus 10 and a radio terminal 20. Note that although the radio communication system 100 is shown in FIG. 3 under the assumption that it includes only one radio communication apparatus 10 and only one radio terminal 20, the radio communication system 100 may include a plurality of radio communication apparatuses and a plurality of radio terminals.

The radio communication apparatus 10 may be, for example, a base station or an access point. The radio communication apparatus 10 may be an NR NodeB (NR NB), a gNodeB (gNB), or an ng-eNB. Alternatively, the radio communication apparatus 10 may be an eNodeB (evolved Node B or eNB). The radio communication apparatus 10 includes an antenna 11. The radio communication apparatus 10 connects to and communicates with the radio terminal 20 through the antenna 11. Note that although the radio communication apparatus 10 is described under the assumption that it includes only one antenna 11, the radio communication apparatus 10 may include a plurality of antennas.

The radio terminal 20 may be, for example, a mobile station, a UE (User Equipment), a WTRU (Wireless Transmit/Receive Unit), or a relay apparatus having a relaying function. The radio terminal 20 includes an antenna 21. The radio terminal 20 connects to and communicates with the radio communication apparatus 10 through the antenna 21. Note that although the radio terminal 20 is described under the assumption that it includes only one antenna 21, the radio terminal 20 may include a plurality of antennas.
<Example of Configuration of Radio Communication Apparatus>

Figure 4:
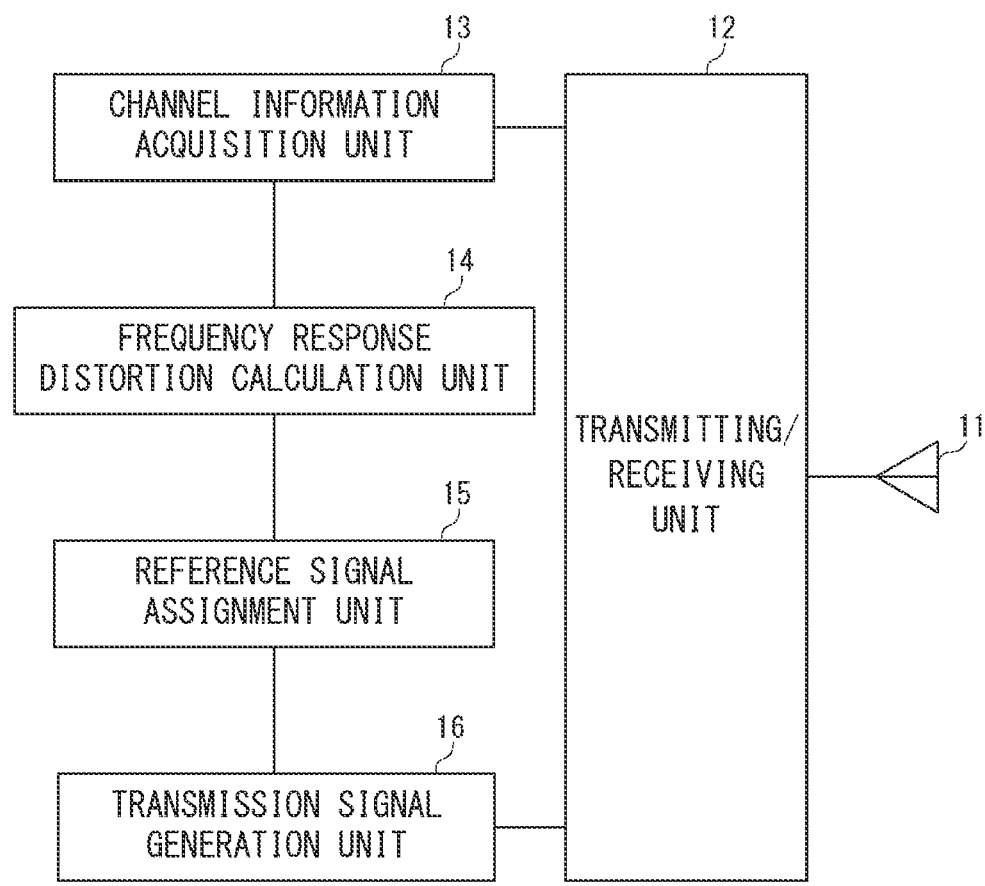
FIG. 4 shows an example of a configuration of a radio communication apparatus according to the second example embodiment.

Next, an example of a configuration of the radio communication apparatus 10 will be described with reference to FIG. 4. FIG. 4 shows the example of the configuration of the radio communication apparatus according to the second example embodiment. The radio communication apparatus 10 includes an antenna 11, a transmitting/receiving unit 12, a channel information acquisition unit 13, a frequency response distortion calculation unit 14, a reference signal assignment unit 15, and a transmission signal generation unit 16.

The antenna 11 receives a radio signal transmitted by the radio terminal 20 and outputs the received radio signal to the transmitting/receiving unit 12. Further, the antenna 11 transmits a radio signal input from the transmitting/receiving unit 12 to the radio terminal 20.

The transmitting/receiving unit 12 converts the radio signal input from the antenna 11 into a baseband signal and outputs the obtained baseband signal to the channel information acquisition unit 13. Further, the transmitting/receiving unit 12 converts a baseband signal input from the transmission signal generation unit 16 into a radio signal and outputs the obtained radio signal to the antenna 11.

Note that depending on the radio communication method used in the radio communication system 100, removal of a CP (Cyclic Prefix), an FFT (Fast Fourier Transform), and the like may need to be performed between the transmitting/receiving unit 12 and the channel information acquisition unit 13. Therefore, although it is not shown in FIG. 4, a module(s) that performs the aforementioned processes may be provided between the transmitting/receiving unit 12 and the channel information acquisition unit 13.

The channel information acquisition unit 13 acquires channel information by using the baseband signal input from the transmitting/receiving unit 12, and outputs the acquired channel information to the frequency response distortion calculation unit 14. The channel information acquired by the channel information acquisition unit 13 may include an estimated value of the frequency response of the channel, may include an estimated value of the impulse response of the channel, and may include a CQI (Channel Quality Indicator) indicating the reception quality of the channel in the downlink. The channel information acquisition unit 13 may calculate the estimated value of the frequency response of the channel by using a reference signal that is to be transmitted from the radio terminal 20 and is known in the radio communication apparatus 10, and a baseband signal including this reference signal received from the channel information acquisition unit 13. The channel information acquisition unit 13 may calculate the estimated value of the impulse response of the channel by performing an inverse Fourier transform for the frequency response of the channel. The channel information acquisition unit 13 may acquire the CQI measured by the radio terminal 20 by demodulating and decoding a baseband signal including the CQI transmitted by the radio terminal 20.

The frequency response distortion calculation unit 14 corresponds to the distortion calculation unit 2 in the first example embodiment. The frequency response distortion calculation unit 14 calculates the degree of distortion of the frequency response of the channel between the radio communication apparatus 10 and the radio terminal 20. Specifically, the frequency response distortion calculation unit 14 calculates the degree of distortion of the frequency response of the channel by using the channel information input from the channel information acquisition unit 13. The frequency response distortion calculation unit 14 outputs the calculated degree of distortion of the frequency response of the channel to the reference signal assignment unit 15. The frequency response distortion calculation unit 14 may calculate the degree of distortion of the frequency response of the channel according to the type of the channel information input from the channel information acquisition unit 13. Further, the frequency response distortion calculation unit 14 may calculate the degree of distortion of the frequency response at a plurality of times, and output an average value of degrees of distortion of frequency responses calculated at different times to the reference signal assignment unit 15.

When the channel information includes the estimated value of the frequency response of the channel, the frequency response distortion calculation unit 14 may calculate, as the degree of distortion of the frequency response of the channel, a variance of magnitudes of estimated values of frequency responses of the channel. Specifically, when the number of sub-carriers is represented by N and the estimated value of the frequency response of the channel in an n-th subcarrier (n is an integer no smaller than 1 and no greater than N) is represented by $H_n$, the frequency response distortion calculation unit 14 may calculate the degree of distortion $\eta$ of the frequency response of the channel by using below-shown Expressions (1) and (2).

[Expression 1]

$$\eta = \frac{1}{N \cdot G^2} \sum_{n=1}^{N} \left( |H_n|^2 - G \right)^2 \quad (1)$$

$$G = \frac{1}{N} \sum_{n=1}^{N} |H_n|^2 \quad (2)$$

When the channel information includes the estimated value of the impulse response of the channel, the frequency response distortion calculation unit 14 may calculate, as the degree of distortion of the frequency response of the channel, a spread of delays of estimated values of impulse responses of the channel. Specifically, when the number of taps of the impulse response is represented by D and the estimated value of the impulse response of a d-th tap (d is an integer no smaller than 1 and no greater than D) is represented by $h_d$, the frequency response distortion calculation unit 14 may calculate the degree of distortion $\eta$ of the frequency response of the channel by using below-shown Expressions (3), (4) and (5).

[Expression 2]

$$\eta = \frac{1}{g} \sum_{d=1}^{D} (d - d_a)^2 \cdot |h_d|^2 \quad (3)$$

$$d_a = \frac{1}{g} \sum_{d=1}^{D} d \cdot |h_d|^2 \quad (4)$$

$$g = \sum_{d=1}^{D} |h_d|^2 \quad (5)$$

When the channel information includes the CQI, the frequency response distortion calculation unit 14 may calculate the variance of the CQI as the degree of distortion of the frequency response of the channel. Note that the CQI may be obtained for each sub-band in which a plurality of sub-carriers is bundled. Specifically, when the number of sub-bands is represented by M and the CQI of a m-th sub-band (m is an integer no smaller than 1 and no greater than M) is represented by $q_m$, the frequency response distortion calculation unit 14 may calculate the degree of distortion $\eta$ of the frequency response of the channel by using below-shown Expressions (6) and (7).

[Expression 3]

$$\eta = \frac{1}{M} \sum_{m=1}^{M} (q_m - q)^2 \quad (6)$$

$$q = \frac{1}{M}\sum_{m=1}^{M} q_m \quad (7)$$

The reference signal assignment unit 15 corresponds to the assignment unit 3 in the first example embodiment. The reference signal assignment unit 15 receives the degree of distortion of the frequency response of the channel from the frequency response distortion calculation unit 14. The reference signal assignment unit 15 assigns a reference signal to the radio terminal 20 based on the degree of distortion of the frequency response of the channel input from the frequency response distortion calculation unit 14, and generates assignment information about the assignment of the reference signal. Specifically, the reference signal assignment unit 15 assigns a reference signal to the radio terminal 20 by determining at least either one of the interval of the transmission (hereinafter also referred to as a transmission interval) of reference signals and the transmission bandwidth thereof based on the degree of distortion of the frequency response of the channel. The reference signal assignment unit 15 generates assignment information about the at least one of the transmission interval of reference signals and the transmission bandwidth thereof determined as described above, and outputs the generated assignment information to the transmission signal generation unit 16. The reference signal may be a reference signal used to measure the quality of the channel in the uplink. The reference signal may be an SRS or any other reference signal different from the SRS.

Figure 5:
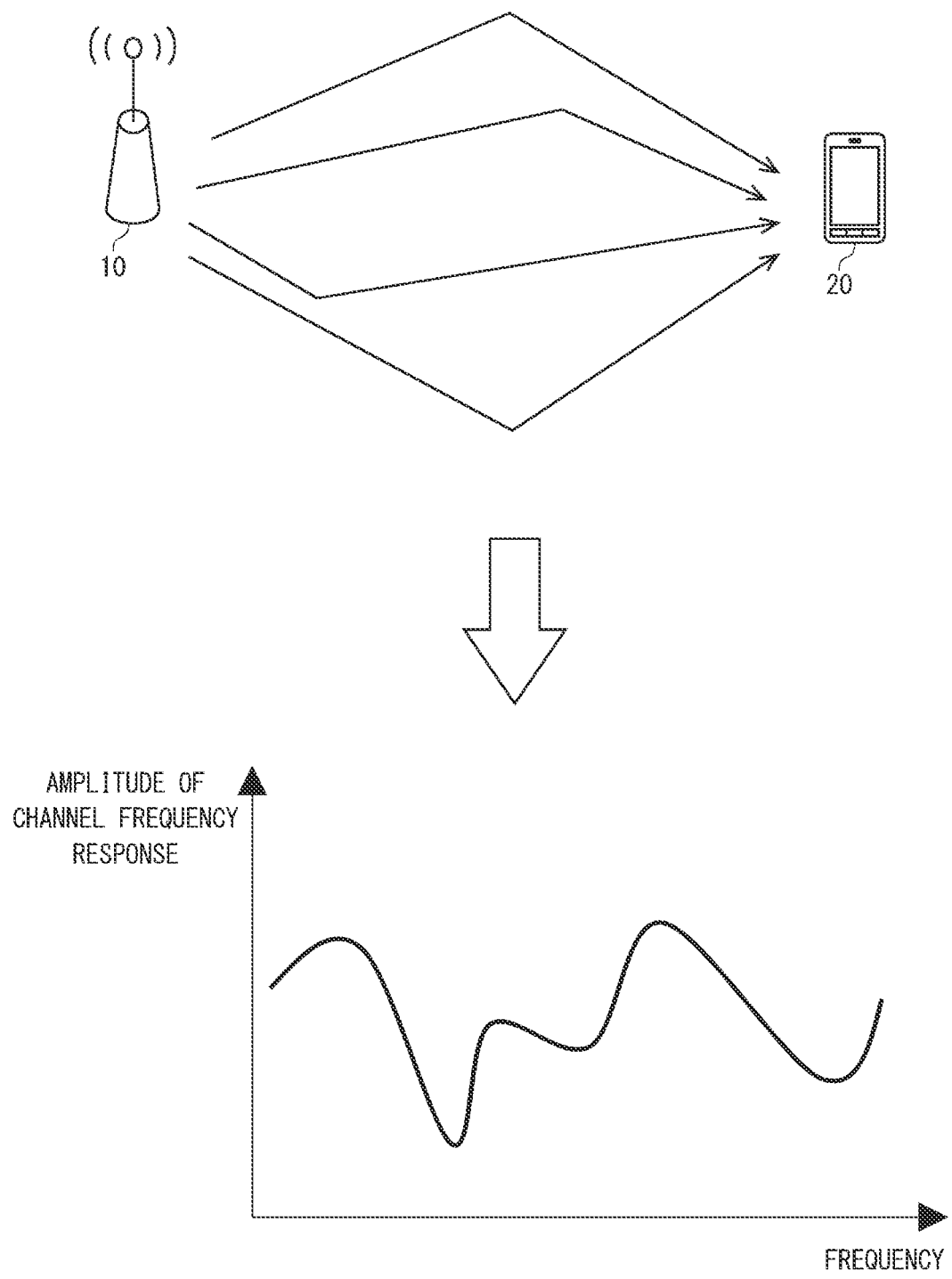
FIG. 5 is a diagram for explaining a relation between a channel state and a frequency response of the channel.
Figure 6:
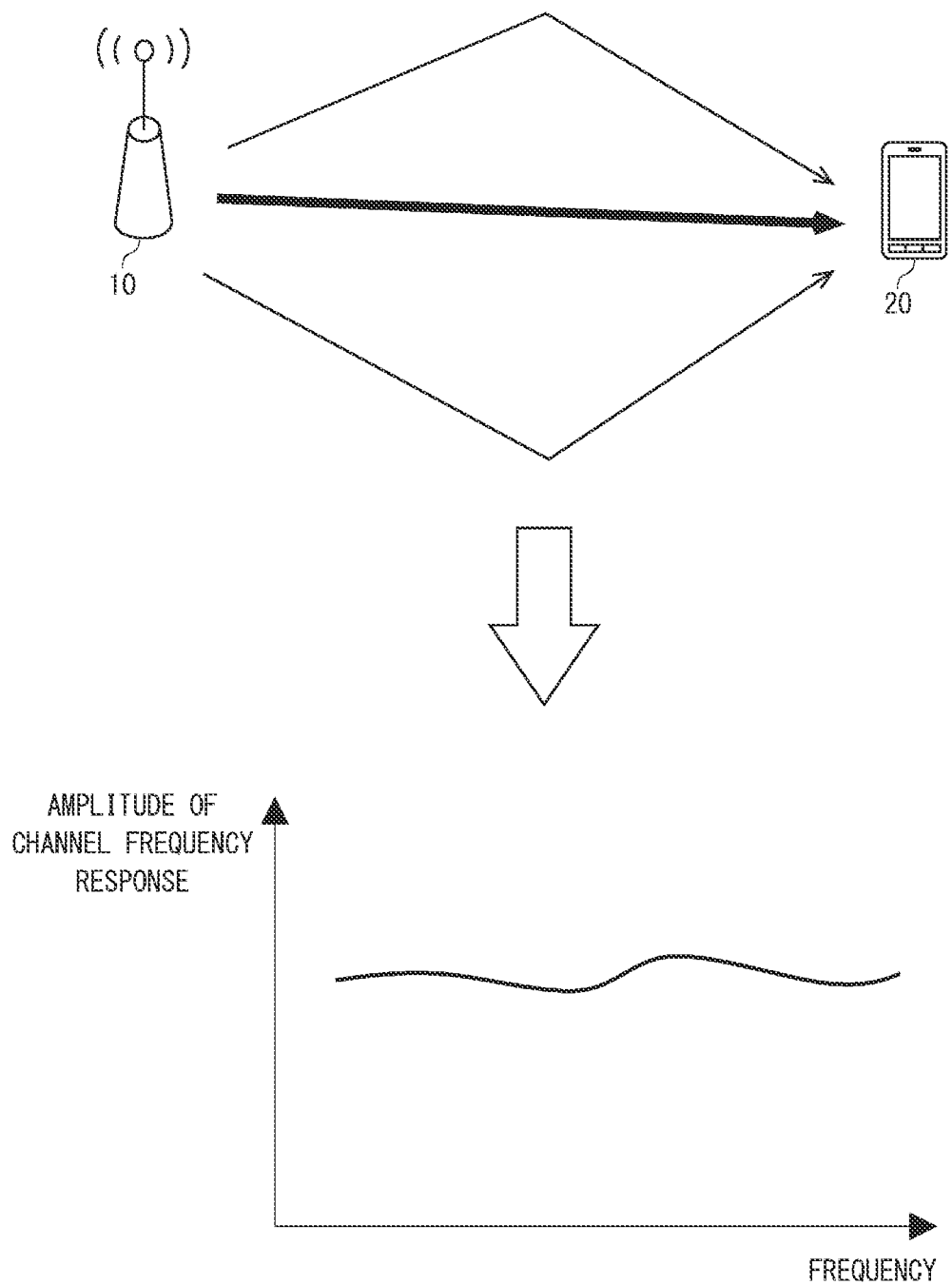
FIG. 6 is a diagram for explaining a relation between a channel state and a frequency response of the channel.

The relation between the channel state and the frequency response of the channel will be described hereinafter with reference to FIGS. 5 and 6. Each of FIGS. 5 and 6 is a diagram for explaining the relation between the channel state and the frequency response of the channel. In each of FIGS. 5 and 6, the upper part shows the state of the channel between the radio communication apparatus 10 and the radio terminal 20. Specifically, in each of FIGS. 5 and 6, the upper part shows the situation of radio waves transmitted from the radio communication apparatus 10 to the radio terminal 20 through a plurality of paths. In each of FIGS. 5 and 6, the lower part shows the relation between the amplitude of the frequency response of the channel and the frequency in the channel state shown in the upper part. In other words, in each of FIGS. 5 and 6, the lower part shows the degree of distortion of the frequency response of the channel in the channel state shown in the upper part.

Firstly, FIG. 5 will be described. FIG. 5 shows a channel state between the radio communication apparatus 10 and the radio terminal 20 in an environment in which, for example, there is no line-of-sight path between the radio communication apparatus 10 and the radio terminal 20. As shown in the upper part of FIG. 5, radio waves output from the radio communication apparatus 10 are reflected, for example, by nearby buildings, the ground, and the like, and hence reach the radio terminal 20 through a plurality of paths. In general, reception powers and the propagation delays of radio waves that have propagated through different paths are different from each other. In such a case, as shown in the lower part in FIG. 5, the amplitude of the frequency response of the channel changes over frequencies. In particular, when differences among the reception powers of a plurality of paths are small and differences among the propagation delays of the paths are large, the degree of distortion of the frequency response of the channel is large.

FIG. 6 shows a channel state between the radio communication apparatus 10 and the radio terminal 20 in a situation in which, for example, there is a line-of-sight path between the radio communication apparatus 10 and the radio terminal 20. For example, when there is a line-of-sight path between the radio communication apparatus 10 and the radio terminal 20, radio waves output from the radio communication apparatus 10 include a direct wave that reaches the radio terminal 20 from the radio communication apparatus 10 without being reflected. Further, when there is a line-of-sight path between the radio communication apparatus 10 and the radio terminal 20, the radio waves output from the radio communication apparatus 10 include reflected waves that reach the radio terminal 20 after being reflected, for example, by nearby buildings, the ground, and the like. A thick arrow shown in the upper part of FIG. 6 represents the direct wave from the radio communication apparatus 10 to the radio terminal 20, and thin arrows represent the reflected waves. In general, the power of a radio wave decreases every time it is reflected, and therefore the direct wave from the radio communication apparatus 10 to the radio terminal 20 is a radio wave having the highest power. When the power of the direct wave is sufficiently larger than those of the reflected waves, the changes of the amplitude of the frequency response of the channel over frequencies is small as shown in the lower part of FIG. 6. That is, for example, under the situation in which there is a line-of-sight path between the radio communication apparatus 10 and the radio terminal 20, the state of the channel is stable, and the changes of the amplitude of the frequency response of the channel is small, so that the radio communication system 100 is in a state in which the degree of distortion is low.

Therefore, the reference signal assignment unit 15 estimates the channel state from the calculated degree of distortion, estimates the degree of temporal changes of the channel from the degree of distortion of the frequency response of the channel, and assigns a reference signal to the radio terminal 20 based on the degree of temporal changes of the channel. Specifically, the reference signal assignment unit 15 estimates the degree of temporal changes of the channel from the degree of distortion of the frequency response of the channel, and determines at least one of the transmission interval of reference signals and the transmission bandwidth thereof.

The description will be continued by referring to FIG. 4 again. When the degree of distortion of the frequency response of the channel is high, the reference signal assignment unit 15 determines that the temporal changes of the channel is likely to be large because it is presumed that the state of the channel is a complicated state, such as a state in which there are a plurality of paths of which the propagation delays are large and the powers are roughly equal to each other. That is, when the degree of distortion of the frequency response of the channel is high, the reference signal assignment unit 15 determines that the state of the channel is the state shown in FIG. 5. On the other hand, when the degree of distortion of the frequency response of the channel is low, the reference signal assignment unit 15 determines that the temporal changes of the channel is small because it is presumed that there is one dominant path such as a path of a direct wave and hence the state of the channel is stable. That is, when the degree of distortion of the frequency response of the channel is low, the reference signal assignment unit 15 determines that the state of the channel is the state shown in FIG. 6.

When the reference signal assignment unit 15 determines that the temporal changes of the channel is large, it assigns, in order to follow the changes, reference signals so that the transmission interval of the reference signals becomes shorter. Further, when the reference signal assignment unit 15 determines that the temporal changes of the channel is large, it assigns, in order to follow the changes, reference signals so that the bandwidth for one transmission of a reference signal becomes larger. On the other hand, when the reference signal assignment unit 15 determines that the temporal changes of the channel is small, it assigns reference signals so that the transmission interval of the reference signals becomes longer. Further, when the reference signal assignment unit 15 determines that the temporal changes of the channel is small, it assigns reference signals so that the bandwidth for one transmission of a reference signal becomes narrower. That is, the reference signal assignment unit 15 sets the transmission interval of reference signals to be assigned to the radio terminal 20 so that the lower the degree of distortion calculated by the frequency response distortion calculation unit 14 is, the longer the transmission interval becomes. Further, the reference signal assignment unit 15 sets the transmission bandwidth of reference signals to be assigned to the radio terminal 20 do that the lower the degree of distortion calculated by the frequency response distortion calculation unit 14 is, the narrower the transmission bandwidth becomes.

The reference signal assignment unit 15 may determine whether the degree of distortion of the frequency response of the channel is high or low by comparing the degree of distortion with a predetermined threshold. The threshold may be set based on a computer simulation. Alternatively, the threshold may be set based on a correlation between the degree of distortion of the frequency response and the degree of temporal changes of the channel that is calculated during actual operations, so that the degrees of temporal changes of the channel can be classified into those having higher values and those having lower values. Note that the threshold may be automatically set by using machine learning or the like based on data that are acquired by computer simulations and/or acquired in actual operations. Further, a plurality of thresholds may be used. That is, a plurality of thresholds may be used according to the degree of temporal changes of the channel. For example, three or more thresholds may be used according to the degree of temporal changes of the channel.

When the reference signal assignment unit 15 assigns the transmission interval of reference signals and the transmission bandwidth thereof based on the degree of distortion of the frequency response of the channel, it may select set values from among candidates for the transmission interval and candidates for the transmission bandwidth that are prepared in advance for each of a plurality of degrees of distortion and can be used for the setting, and assign the selected set values. The transmission interval of reference signals and the transmission bandwidth thereof that can be used for the setting depend on the number of radio terminals to which reference signals are assigned. Therefore, the reference signal assignment unit 15 may change the candidates for the transmission interval and the transmission bandwidth that can be used for the setting according to the number of radio terminals. Candidates for the transmission interval and the transmission bandwidth that can be used for the setting may be prepared according to the number of terminals to which reference signals are assigned.

Further, when information about the moving speed of the radio terminal 20 can be obtained, the reference signal assignment unit 15 may use the moving speed of the radio terminal 20 for the assignment of reference signals. The reference signal assignment unit 15 may set the transmission interval of reference signals to be assigned to the radio terminal 20 and the transmission bandwidth thereof based on the degree of distortion of the frequency response of the channel, and may adjust the set transmission interval and the transmission bandwidth based on the movement speed of the radio terminal 20. The higher the moving speed is, the more the temporal changes of the channel are likely to become larger. Therefore, the reference signal assignment unit 15 may adjust the set transmission interval of reference signals to be assigned to the radio terminal 20 and the transmission bandwidth thereof so that the higher the moving speed of the radio terminal 20 is, the shorter transmission interval and the wider transmission bandwidth are assigned.

The transmission signal generation unit 16 generates a baseband signal that is used to notify the radio terminal 20 of the assignment information about the transmission interval of reference signals and the transmission bandwidth thereof, input from the reference signal assignment unit 15, and outputs the generated baseband signal to the transmitting/receiving unit 12.

<Example of Operations Performed by Radio Communication Apparatus>

Figure 7:
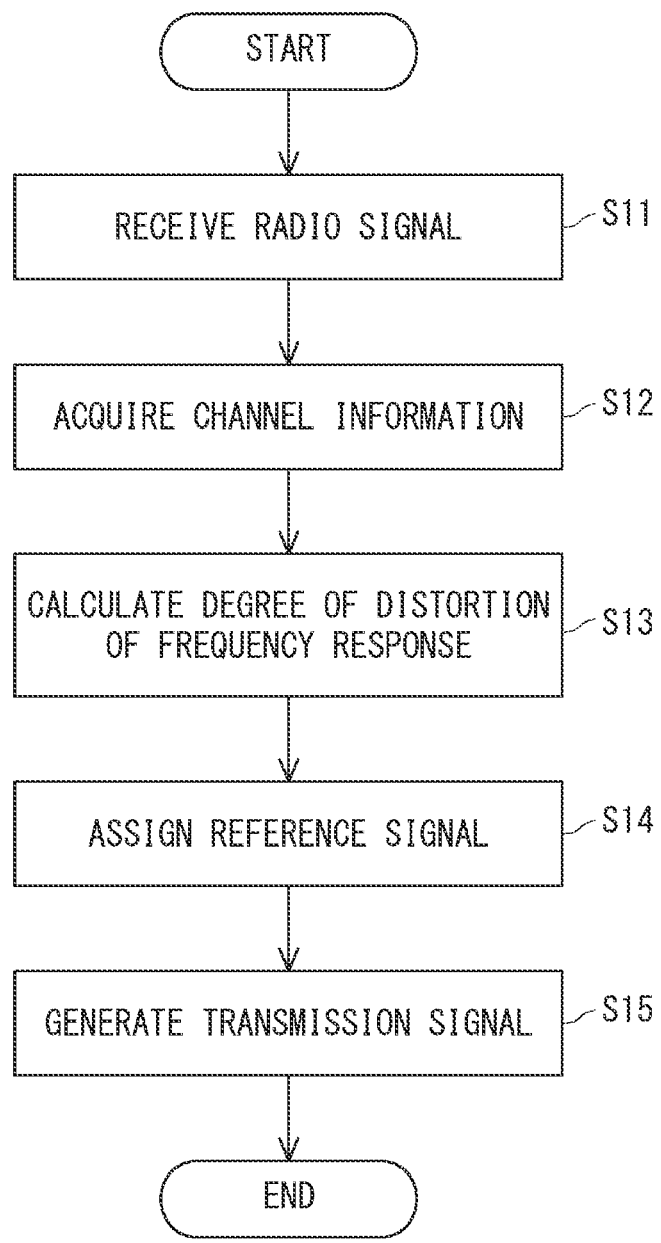
FIG. 7 is a flowchart showing an example of operations performed by the radio communication apparatus according to the second example embodiment.

An example of operations performed by the radio communication apparatus 10 will be described with reference to FIG. 7. FIG. 7 is a flowchart showing the example of operations performed by the radio communication apparatus according to the second example embodiment.

The antenna 11 receives a radio signal transmitted from the radio terminal 20 (Step S11). The transmitting/receiving unit 12 converts the radio signal input from the antenna 11 into a baseband signal. The transmitting/receiving unit 12 outputs the baseband signal to the channel information acquisition unit 13.

The channel information acquisition unit 13 acquires channel information from the baseband signal (Step S12). The channel information acquisition unit 13 outputs the channel information to the frequency response distortion calculation unit 14.

The frequency response distortion calculation unit 14 calculates the degree of distortion of the frequency response of the channel by using the channel information (Step S13). When the channel information includes an estimated value of the frequency response of the channel, the frequency response distortion calculation unit 14 may calculate, as the degree of distortion of the frequency response of the channel, a variance of magnitudes of estimated values of frequency responses of the channel. When the channel information includes an estimated value of the impulse response of the channel, the frequency response distortion calculation unit 14 may calculate, as the degree of distortion of the frequency response of the channel, a spread of delays of estimated values of impulse responses of the channel. When the channel information includes a CQI, the frequency response distortion calculation unit 14 may calculate a variance of the CQI as the degree of distortion of the frequency response of the channel.

The reference signal assignment unit 15 determines the transmission frequency of reference signals to be set for the radio terminal 20 and the frequency bandwidth thereof based on the degree of distortion of the frequency response of the channel (Step S14). The reference signal assignment unit 15 sets the transmission interval of reference signals to be assigned to the radio terminal 20 so that the lower the degree of distortion calculated by the frequency response distortion calculation unit 14 is, the longer the transmission interval becomes. Further, the reference signal assignment unit 15 sets the transmission bandwidth of reference signals to be assigned to the radio terminal 20 so that the lower the degree of distortion calculated by the frequency response distortion calculation unit 14 is, the narrower the transmission bandwidth becomes.

The transmission signal generation unit 16 generates a baseband signal that is used to notify the radio terminal 20 of the assignment information about the transmission interval of reference signals, the transmission bandwidth thereof, and the like (Step S15). Further, the transmitting/receiving unit 12 converts the baseband signal input from the transmission signal generation unit 16 into a radio signal and outputs the obtained radio signal to the antenna 11. The antenna 11 transmits the radio signal to the radio terminal 20.

As described above, the frequency response distortion calculation unit 14 calculates the degree of distortion of the frequency response of the channel between the radio communication apparatus 10 and the radio terminal 20. The reference signal assignment unit 15 assigns the transmission interval of reference signals and the transmission bandwidth thereof to the radio terminal 20 based on the degree of distortion of the frequency response of the channel. The reference signal assignment unit 15 can determine the stability of the channel based on the degree of distortion of the frequency response of the channel. Further, the reference signal assignment unit 15 can estimate the degree of temporal changes of the channel based on the result of the determination on the stability of the channel. That is, the reference signal assignment unit 15 can assign reference signals to the radio terminals 20 while taking the degree of temporal changes of the channel into consideration. Therefore, according to the radio communication apparatus 10 in accordance with the second example embodiment, it is possible to appropriately assign a reference signal to the radio terminal 20 according to the state of the channel thereof so as to avoid excessive assignment while following the temporal changes of the channel. Therefore, according to the radio communication apparatus 10 in accordance with the second example embodiment, it is possible to appropriately assign a reference signal to the radio terminal 20.

Other Example Embodiment

Figure 8:
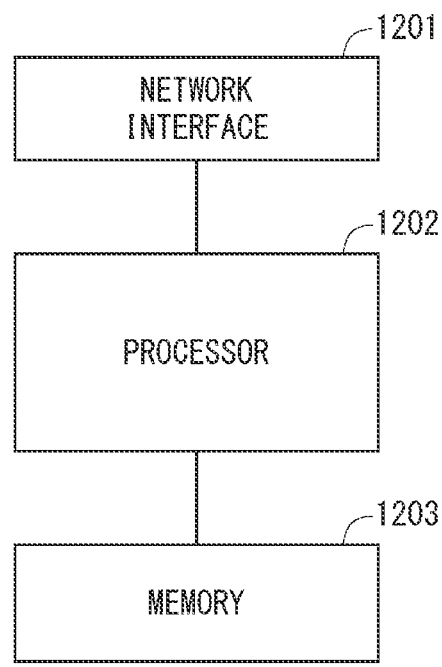
FIG. 8 is a block diagram showing a hardware configuration of a computer (an information processing apparatus) capable of implementing a radio communication apparatus or the like according to each of the example embodiments of the present disclosure can.

Each of the radio communication apparatuses 1 and 10, and the radio terminal 20 (hereinafter also referred to as "the radio communication apparatus 1 or the like") in the above-described example embodiments may have a hardware configuration described below. FIG. 8 is a block diagram showing an example of the hardware configuration of a computer (an information processing apparatus) capable of implanting the radio communication apparatus or the like according to each example embodiment of the present disclosure.

Referring to FIG. 8, the radio communication apparatus 1 or the like includes a network interface 1201, a processor 1202, and a memory 1203. The network interface 1201 is used to communicate with other communication apparatuses included in the radio communication system.

The processor 1202 performs processes performed by the radio communication apparatus 1 or the like explained above with reference to a flowchart in the above-described example embodiments by loading software (a computer program) from the memory 1203 and executing the loaded software. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage disposed remotely from the processor 1202. In this case, the processor 1202 may access the memory 1203 through an I/O (Input/Output) interface (not shown).

In the example shown in FIG. 8, the memory 1203 is used to store a group of software modules. The processor 1202 can perform processes performed by the radio communication apparatus 1 or the like explained above in the above-described example embodiments by loading the group of software modules from the memory 1203 and performing processes according to instructions by the loaded software modules.

As explained above with reference to FIG. 8, each of the processors included in the radio communication apparatus 1 or the like in the above-described example embodiments executes one or a plurality of programs including a group of instructions for causing a computer to perform an algorithm explained above with reference to the drawings.

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

The User Equipment (or "UE", "mobile station", "mobile terminal", "mobile device", or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile terminal", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT: Internet of Things)", using a variety of wired and/or wireless communication technologies.

IoT devices (or "things") may be equipped with appropriate electronics, software, sensors, network connectivity, and/or the like, which enable these devices to collect and exchange data with each other and with other communication devices.

IoT devices may comprise automated equipment that follows software instructions stored in an internal memory.

IoT devices may operate without requiring human supervision or interaction.

IoT devices might also remain stationary and/or inactive for a long period of time.

IoT devices may be implemented as a part of a (generally) stationary apparatus. IoT devices may also be embedded in non-stationary apparatus (e.g., vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices.

It will be appreciated that a UE may support one or more IoT or MTC applications.

Some examples of MTC applications are listed in the following table (source: 3GPP TS22.368 V13.2.0 (2017 Jan. 13), Annex B, the contents of which are incorporated herein by reference). This list is not exhaustive and is intended to be indicative of some examples of MTC (Machine Type Communication) applications.

TABLE 1

| Service Area | MTC applications |
|---|---|
| Security | Surveillance systems |
|  | Backup for landline |
|  | Control of physical access (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimization/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/ Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, an IoT (Internet of Things) service, a community service, a video streaming service, a femto cell application service, a VoLTE (Voice over LTE) service, a wireless TAG service, a charging service, a radio on demand service, a roaming service, an activity monitoring service, a telecom carrier/communication NW selection service, a functional restriction service, a PoC (Proof of Concept) service, a personal information management service, an ad-hoc NW (NetWork)/DTN (Delay Tolerant Networking) service, etc.

It is possible to provide a radio communication apparatus, a reference signal assignment method, a reference signal assignment program, and a non-transitory computer readable medium storing thereof capable of appropriately assigning a reference signal to a radio terminal.

Further, the above-described UE categories are merely examples of applications of the technical ideas and example embodiments described in the present document. Needless to say, these technical ideas and embodiments are not limited to the above-described UE and various modifications can be made thereto.

Note that the present disclosure is not limited to the above-described example embodiments and various changes may be made therein without departing from the spirit and scope of the present disclosure. Further, the present disclosure may be implemented by combining example embodiments with one another.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

Supplementary Note 1

A radio communication apparatus comprising:
a distortion calculation unit configured to calculate a degree of distortion of a frequency response of a channel between the radio communication apparatus and a radio terminal; and
an assignment unit configured to assign a reference signal to the radio terminal based on the degree of distortion.

Supplementary Note 2

The radio communication apparatus described in Supplementary note 1, wherein the distortion calculation unit calculates the degree of distortion by using an estimated value of the frequency response of the channel.

Supplementary Note 3

The radio communication apparatus described in Supplementary note 2, wherein the distortion calculation unit calculates a variance of magnitudes of the estimated values as the degree of distortion.

Supplementary Note 4

The radio communication apparatus described in Supplementary note 1, wherein the distortion calculation unit calculates the degree of distortion by using an estimated value of an impulse response of the channel.

Supplementary Note 5

The radio communication apparatus described in Supplementary note 4, wherein the distortion calculation unit calculates a spread of a delay of the estimated values of the impulse responses of the channel as the degree of distortion.

Supplementary Note 6

The radio communication apparatus described in Supplementary note 1, wherein the distortion calculation unit calculates the degree of distortion by using a CQI (Channel Quality Indicator) reported from the radio terminal.

Supplementary Note 7

The radio communication apparatus described in Supplementary note 6, wherein the distortion calculation unit calculates a variance of the CQI as the degree of distortion.

Supplementary Note 8

The radio communication apparatus described in any one of Supplementary notes 1 to 7, wherein the assignment unit assigns the reference signal to the radio terminal by setting at least one of a transmission interval of the reference signal and a transmission bandwidth thereof based on the degree of distortion.

Supplementary Note 9

The radio communication apparatus described in Supplementary note 8, wherein the assignment unit sets the transmission interval so that the smaller the degree of distortion is, the longer the transmission interval becomes.

Supplementary Note 10

The radio communication apparatus described in Supplementary note 8 or 9, wherein the assignment unit sets the transmission bandwidth so that the smaller the degree of distortion is, the narrower the transmission bandwidth becomes.

Supplementary Note 11

The radio communication apparatus described in any one of Supplementary notes 1 to 10, wherein the assignment unit assigns the reference signal by further using a moving speed of the radio terminal.

Supplementary Note 12

The radio communication apparatus described in Supplementary note 11, wherein the assignment unit assigns the reference signal so that the higher the moving speed is, the shorter transmission interval of the reference signal becomes.

Supplementary Note 13

The radio communication apparatus described in Supplementary note 11 or 12, wherein the assignment unit assigns the reference signal so that the higher the moving speed is, the wider the transmission bandwidth of the reference signal becomes.

Supplementary Note 14

A reference signal assignment method performed by a radio communication apparatus, comprising:
calculating a degree of distortion of a frequency response of a channel between the radio communication apparatus and a radio terminal; and
assigning a reference signal to the radio terminal based on the degree of distortion.

Supplementary Note 15

A non-transitory computer readable medium storing a reference signal assignment program for causing a radio communication apparatus to perform a reference signal assignment method, the reference signal assignment method comprising:
calculating a degree of distortion of a frequency response of a channel between the radio communication apparatus and a radio terminal; and
assigning a reference signal to the radio terminal based on the degree of distortion.

What is claimed is:

1. A radio communication apparatus comprising:
at least one memory storing instructions, and
at least one processor configured to execute the instructions to:
calculate a degree of distortion of a frequency response of a channel between the radio communication apparatus and a radio terminal, the distortion of the frequency response of the channel being due to multipath propagation in the channel; and
assign a reference signal to the radio terminal based on the degree of distortion,
wherein the at least one processor is further configured to execute the instructions to assign the reference signal to the radio terminal by setting at least one of a transmission interval of the reference signal and a transmission bandwidth thereof based on the degree of distortion.

2. The radio communication apparatus according to claim 1, wherein the at least one processor is further configured to execute the instructions to calculate the degree of distortion by using an estimated value of the frequency response of the channel.

3. The radio communication apparatus according to claim 2, wherein the at least one processor is further configured to execute the instructions to calculate a variance of magnitudes of the estimated values as the degree of distortion.

4. The radio communication apparatus according to claim 1, wherein the at least one processor is further configured to execute the instructions to calculate the degree of distortion by using an estimated value of an impulse response of the channel.

5. The radio communication apparatus according to claim 4, wherein the at least one processor is further configured to execute the instructions to calculate a spread of a delay of the estimated values of the impulse responses of the channel as the degree of distortion.

6. The radio communication apparatus according to claim 1, wherein the at least one processor is further configured to execute the instructions to calculate the degree of distortion by using a CQI (Channel Quality Indicator) reported from the radio terminal.

7. The radio communication apparatus according to claim 6, wherein the at least one processor is further configured to execute the instructions to calculate a variance of the CQI as the degree of distortion.

8. The radio communication apparatus according to claim 1, wherein the at least one processor is further configured to execute the instructions to set the transmission interval so that the smaller the degree of distortion is, the longer the transmission interval becomes.

9. The radio communication apparatus according to claim 1, wherein the at least one processor is further configured to execute the instructions to set the transmission bandwidth so that the smaller the degree of distortion is, the narrower the transmission bandwidth becomes.

10. The radio communication apparatus according to claim 1, wherein the at least one processor is further configured to execute the instructions to assign the reference signal by further using a moving speed of the radio terminal.

11. The radio communication apparatus according to claim 10, wherein the at least one processor is further configured to execute the instructions to assign the reference signal so that the higher the moving speed is, the shorter transmission interval of the reference signal becomes.

12. The radio communication apparatus according to claim 10, wherein the at least one processor is further configured to execute the instructions to assign the reference signal so that the higher the moving speed is, the wider the transmission bandwidth of the reference signal becomes.

13. A reference signal assignment method performed by a radio communication apparatus, comprising:
calculating a degree of distortion of a frequency response of a channel between the radio communication apparatus and a radio terminal, the distortion of the frequency response of the channel being due to multipath propagation in the channel; and
assigning a reference signal to the radio terminal based on the degree of distortion,
wherein the assigning the reference signal includes setting at least one of a transmission interval of the reference signal and a transmission bandwidth thereof based on the degree of distortion.

14. A non-transitory computer readable medium storing a reference signal assignment program for causing a radio communication apparatus to perform a reference signal assignment method, the reference signal assignment method comprising:
calculating a degree of distortion of a frequency response of a channel between the radio communication apparatus and a radio terminal, the distortion of the frequency response of the channel being due to multipath propagation in the channel; and
assigning a reference signal to the radio terminal based on the degree of distortion,
wherein the assigning the reference signal includes setting at least one of a transmission interval of the reference signal and a transmission bandwidth thereof based on the degree of distortion.

* * * * *